United States Patent [19]

Triebs et al.

[11] Patent Number: 4,789,600
[45] Date of Patent: Dec. 6, 1988

[54] METHOD FOR MANUFACTURING LAMINATED GLASSES

[75] Inventors: Friedrich Triebs; Helmer Raedisch, both of Aachen, Fed. Rep. of Germany; Jean-Louis Bravet, Thourotte; Jean-Claude Abel, Chenneviere; Noël Crux, Margny Les Compiegne, all of France

[73] Assignee: Saint-Gobain Vitrage, Courbevoie, France

[21] Appl. No.: 29,650

[22] Filed: Mar. 24, 1987

[30] Foreign Application Priority Data

Mar. 24, 1986 [FR] France ............................. 86 04155

[51] Int. Cl.$^4$ ..................... B32B 17/10; B32B 27/40
[52] U.S. Cl. .................................. 428/425.6; 156/99; 156/107; 156/331.4; 428/46; 428/420
[58] Field of Search ............... 156/99, 106, 107, 305, 156/331.4; 428/46, 420, 425.6

[56] References Cited

U.S. PATENT DOCUMENTS 3,657,057  4/1972  Shorr et al. ..................... 156/99 X
3,881,043  4/1975  Rieser et al. .................... 156/99 X Primary Examiner—Robert A. Dawson
Attorney, Agent, or Firm—Oblon, Fisher, Spivak, McClelland & Maier

[57] ABSTRACT

A method for the manufacture of a laminated glass assembly comprising (1) a monolithic or laminated glass and/or plastic support having an glazed edge, and (2) a plastic sheet comprising at least one layer of polyurethane in contact with the surface having the glazed edge is disclosed. In the invention, at least one of the two contact surfaces of the glazed edge with the polyurethane layer is treated, before the assembly of the support with the plastic sheet on an area corresponding essentially to the glazed edge, by the deposit of a primer comprising a reactive mixture having free NCO groups. The free NCO groups are capable of reacting with the glazed support and with the plastic sheet and of forming cross-linking bonds with the other components of the primer at the time of the heat cycle of the subsequent assembly. The plastic sheet is the assembled with the support, and the glass undergoes a heat cycle which enables the reaction of the primer and the definitive peripheral adhesion of the glass.

23 Claims, No Drawings

200
METHOD FOR MANUFACTURING LAMINATED GLASSES

BACKGROUND OF THE INVENTION

1. Field of the Invention

The present invention relates to the manufacture of laminated glass assemblies.

2. Discussion of the Background

Laminated glass assemblies formed by (1) a monolithic or laminated glass and/or plastic support in combination with (2) a sheet of plastic comprising at least one polyurethane layer can be used advantageously as front windshields or rear windshields for motor vehicles, or even as windows for buildings. The mounting of these glass assemblies in the bay of an automobile body which has traditionally been done using a profiled joint in a resilient material is more and more frequently being replaced by mounting by gluing the glass directly onto the body.

In effect, this type of mounting has advantages. In particular, it holds the windshield in the bay of the body in case of a violent shock. It can easily be automated and, in addition, it provides a flush mount of the glass to the body which reduces the air drag coefficient of the vehicle.

When a conventional laminated glass assembly, that is, a glass formed by two sheets of glass and an interposed sheet of an energy-absorbing material such as polyvinylbutyral, is mounted, the gluing of the glass onto a fold in the sheet metal of the body is carried out by the deposit of an appropriate adhesive cord onto a glazed edge arranged on the periphery of the surface directed towards the passenger compartment. This is intended to protect the adhesive from UV radiation and also to hide the unesthetic glue joint from view.

In the case of safety glasses to which the present invention relates and which are formed by a rigid support and a sheet of flexible plastic, the glazed edge is provided on the surface of the support which is directed towards the passenger area, that is, the one in contact with the plastic sheet and, in particular, in contact with the polyurethane layer. For this type of safety glass, the glazed edge is a source of manufacturing difficulties of the glasses. In particular it creates a problem of adhesion of the plastic sheet onto said glazed edge. The problem can be insufficient gluing at the moment of manufacture of the glass itself or during the preliminary calendering assembly operation when this operation is used for assembly. In certain cases instantaneous detachment of the plastic sheet at the location of the glazed border can be observed. This detachment is a serious problem which cannot be repaired during the final assembly operation using an autoclave cycle, for example.

Even where there is no immediate detachment, the bond is still generally not sufficiently strong or it even becomes damaged when the glass is subjected to more rigorous climate conditions than those generally encountered in a shop for manufacturing laminated glasses. For example, problems can arise when the glass is placed in a very damp atmosphere.

When the plastic sheet does not have to act as an energy absorber it is possible to solve the adhesion problem by using a plastic sheet cut to a more reduced format such that it does not cover the glazed band. The gluing of the glass then is carried out as in the case of conventional laminated glasses by the deposit of the glue joint directly onto the glazed band.

However, when the plastic sheet must act as an energy absorber and it has the qualities required for that purpose, it is necessary to directly glue the periphery of the sheet onto the bay of the body with satisfactory adhesion. This level of adhesion between the sheet and the support must be maintained over time. This is essential to confer its safety properties to the glass.

Thus existing technology suffers from problems of poor adhesion between the plastic sheet in the support. There is accordingly a strongly felt need for a solution to this problem.

SUMMARY OF THE INVENTION

Accordingly, it is an object of this invention to provide a method for the manufacture of a laminated glass assembly comprising (1) a monolithic or laminated glass and/or a plastic support having a glazed edge on one surface and (2) a plastic sheet comprising at least one polyurethane layer in contact with the surface having the glazed surface in which there is a very high level of adhesion between the plastic sheet and the support.

The inventors have now discovered that this object of the invention, and other objects which will become apparent from a reading of the description of the invention given hereinbelow have been satisfied with the method of the present invention.

This invention thus provides a method for the manufacture of a laminated glass assembly comprising (1) a monolithic or laminated glass and/or a plastic support having a glazed edge on one surface, and (2) a sheet of plastic comprising at least one layer of polyurethane in contact with the surface having the glazed edge. In this method, before the assembly of the support with the plastic sheet and on an area corresponding essentially to the glazed edge, at least one of the two contact surfaces of the glazed edge with the polyurethane layer is treated with a primer. This primer comprises a reactive mixture having free NCO groups. These free NCO groups are capable of reacting with the glazed support and with the plastic sheet, and these free NCO groups are also capable of forming cross-linking bonds with the other components of the primer at the moment of the heat cycle of the subsequent assembly.

The plastic sheet (2) is assembled with the support (1), and the glass is then submitted to a heat cycle. This results in the reaction of the primer and the formation of a definitive adhesive bond on the periphery of the glass.

DETAILED DESCRIPTION OF THE PREFERRED EMBODIMENTS

The invention provides a method for the manufacture of laminated glass assemblies comprising (1) a monolithic or laminated support made of glass and/or plastic having a glazed edge on one surface, and (2) a plastic sheet comprising at least one polyurethane layer in contact with the surface having the glazed edge. This method solves the problems of adhesion between the plastic sheet and the support by providing a adhesive bond which fully satisfies the safety standards for the laminated sheets used in motor vehicles, particularly as windshields.

In accordance with the invention and before assembly of the support with the plastic sheet, a primer is deposited on a peripheral area essentially corresponding to the glazed edge. This primer is deposited on at least one of the two contact surfaces of the glazed edge and the polyurethane layer.

This primer comprises a reactive mixture having free NCO groups. These free NCO groups are capable of reacting with the glazed support and with the plastic sheet, and of forming cross-linking bonds with the other components of the primer at the moment of the heating cycle of the subsequent assembly. The plastic sheet is assembled with the support and the glass undergoes a heating cycle which generally consists of placing the glass at a temperature of between 120° and 140° C., generally approximately 130° C. for between 0.5 to 1.5 hours, generally approximately one hour. This heating cycle causes the reaction of the primer and thus provides a definitive adhesion on the periphery of the glass.

In accordance with one aspect of the invention, the reactive mixture is formed of conventional reactive starting components to form a polyurethane with a cross-linked structure. These conventional starting components are essentially a polyol component and an isocyanate component. One or the other of these, or both of them, should have a functionality greater than 2 and/or be used in quantities corresponding to an excess of NCO group in relation to the hydroxyl groups of the polyol component.

The polyol component comprises at least one long polyol selected from among the polyetherdiols, polyesterdiols or polycaprolactonediols having a molecular weight of between 500 and 4000. The polyol component also comprises at least one short diol selected from among those conventionally used as a chain extender in the preparation of polyurethanes. For example substituted and/or esterified ethyleneglycol, 1,2-propanediol, 1,3-propanediol, 1,2-butanediol, 1,3-butanediol, 1,4-butanediol, 2,2-dimethyl-1,3-propanediol (neopentylglycol), 1,5-pentanediol, 1,6-hexanediol, 1,8-octanediol, 1,10-decanediol, 1,12-dodecanediol, cyclohexanedimethanol, bisphenol A, 2-methyl-2,4-pentanediol, 3-methyl-2,4-pentanediol, 2-ethyl-1,3-hexanediol, 2,2,4-trimethyl-1,3-pentanediol, diethyleneglycol, triethyleneglycol, tetraethyleneglycol, 2-butyne-1,4-diol-1,4-butanediol and decynediol; hydroquinonebishydroxyethylether, bisphenol A esterified by two or four propylene oxide groups; dimethylolpropionic acid can be used.

The polyol component further preferably comprises at least one polyol with a functionality of greater than 2. In particular one may use monomeric aliphatic triols such as glycerol, trimethylolpropane, triols with polyether chains, polycaprolactone triols, with the molecular weight of said triols generally being between 90 and 1000. Mixed polyether/polyester polyols with a functionality of greater than 2, for example a functionality of between 2 and 3 having a molecular weight of between 90 and 1000 can be used.

The proportions between the long polyol, the short diol and the polyol with a functionality of greater than 2 can vary depending on the selection of the other components of the primer.

The isocyanate component comprises at least one isocyanate selected in particular from among the following aliphatic difunctional isocyanates: hexamethylenediisocyanate (HMDI), 2,2,4-trimethyl-1,6-hexanediisocyanate (TMDI), bis-4-isocyanatocyclohexylmethane (Hylene W), bis-3-methyl-4-isocyanatocyclohexylmethane, 2,2-bis-(4-isocyanatocyclohexyl)propane, 3-isocyanatomethyl-3,5,5-trimethylcyclohexylisocyanate (IPDI), m-xylylenediisocyanate (XDI), m- and p-tetramethylxylylenediisocyanate (m- and p-TMXDI), 1,4-trans-cyclohexane diisocyanate (CHDI), 1,3-(diisocyanatomethyl)cyclohexane (hydrogenated XDI) and isocyanates having a functionality of greater than 2 such as isocyanate biurets or isocyanurates.

As necessary, the isocyanate can comprise one or several aromatic isocyanates. However, for reasons of compatability of the primer with the polyurethane layer which is to be glued, it appears to be preferable to use aliphatic isocyanates of the same type as that or those used for the manufacture of the polyurethane layer.

In accordance with another aspect of the invention, the reactive mixture is formed from a urethane prepolymer with free NCO groups, at least one polyol with a functionality of greater than 2 and, as necessary, at least one short diol.

Suitable urethane prepolymers are obtained by reaction of a polyol component with an isocyanate component, said isocyanate component being in excess. The prepolymers obtained generally have a content of free NCO groups of between 0.1% and 15% by weight.

In accordance with another aspect of the invention, the reactive mixture is formed from a prepolymer with free OH groups, and at least one isocyanate whose functionality is equal to or greater than 2, in particular a triisocyanate. When the reactive mixture contains only one diisocyanate, this diisocyanate is used in excess in relation to the free OH groups of the prepolymer, so as to obtain crosslinking of the polyurethane produced from the primer during the final assembly of the laminated glass elements.

Suitable prepolymers with free OH groups are formed from a polyol component and an isocyanate component. The polyol component is used in excess such that the ratio of the NCO/OH equivalents is between approximately 0.6 and 0.9. When the ratio is below 0.6, the prepolymer is generally unsatisfactory because the primer obtained has insufficient cohesion. On the other hand, when the ratio is above 0.9, the primer generally has insufficient gluing.

In accordance with another aspect of the invention, the reactive mixture is formed from an essentially thermoplastic polyurethane and at least one isocyanate having a functionality of greater than 2. In particular an isocyanate or triisocyanurate biuret can be used.

As a suitable polyurethane, the thermoplastic polyurethanes described in French patent publication No. 2 398 606, for example, can be used. For example, long diols, associated, as appropriate, with short diols, chain extenders, can be used as the polyol component. For long diols, aliphatic polyesters can be taken, such as those formed from one or several acids, such as malonic acid, succinic acid, glutaric acid, adipic acid, suberic acid or sebacic acid and diols, such as 1,2-ethanediol (ethyleneglycol), 1,2-propanediol, 1,3-propanediol, 1,2-butanediol, 1,3-butanediol, 1,4-butanediol, 2,2-dimethyl-1,3-propanediol (neopentylglycol), 1,6-hexanediol, 2-methyl-2,4-pentanediol, 3-methyl-2,4-pentane-diol, 2-ethyl-1,3-hexanediol, 2,2,4-trimethyl-1,3-pentandiol, diethyleneglycol, triethyleneglycol, polyethyleneglycols, dipropyleneglycol, tripropyleneglycol, polypropyleneglycols, or 2,2-bis(4-hydroxycyclohexyl)propane. Optionally combination of these can be used.

In the preparation of the polyester diol, lactones such as gamma-butyrolactone, gamma-valerolactone, delta-valerolactone and epsilon-caprolactone can be added. The molecular weight of the polyester is advantageously approximately 500 to 4000 and preferably approximately 1000 to 2000.

Linear polyethers with a molecular weight falling within the above-identified ranges and obtained, for example, from ethylene oxide, 1,2-propylene oxide and tetrahydrofuran, can also be suitable as long diols.

Aliphatic difunctional isocyanates suitable for reaction with the above-identified diols (the polyesters and/or the polyethers) for the formation of the thermoplastic polyurethane include 1,6-hexanediisocyanate, 2,2,4-trimethyl-1,6-hexanediisocyanate, 2,2,4-trimethyl-1,6-hexanediisocyanate, 2,4,4-trimethyl-1,6-hexanediisocyanate, 1,3-bis(isocyanatomethyl)benzene, bis(4-isocyanatocyclohexyl)methane, bis(3-methyl-4-isocyanatocyclohexyl)methane, 2,2-bis(4-isocyanatocyclohexyl)propane and 3-isocyanatomethyl-3,5,5-trimethylcyclohexylisocyanate.

The essentially thermoplastic polyurethane can further be obtained as described in European patent publication No. 0 133 090 from a polyol component and a polyisocyanate component. For this purpose, the polyol component comprises at least one long polyol selected from among the polyetherdiols, the polyesterdiols or the polycaprolactonediols having a molecular weight of between 500 and 4000. It also comprises at least one short diol selected from among those conventionally used as chain extenders in the preparation of polyurethanes, for example substituted and/or esterified ethyleneglycol, 1,2-propanediol, 1,3-propanediol, 1,2-butanediol, 1,3-butanediol, 1,4-butanediol, 2,2-dimethyl-1,3-propanediol (neopentylglycol), 1,5-pentanediol, 1,6-hexanediol, 1,8-octanediol, 1,10-decanediol, 1,12-dodecanediol, cyclohexanedimethanol, bisphenol A, 2-methyl-2,4-pentanediol, 3-methyl-2,4-pentanediol, 2-ethyl 1,3-hexanediol, 2,2,4-trimethyl-1,3-pentanediol, diethyleneglycol, triethyleneglycol, tetraethyleneglycol, 2-butyne-1,4-diol-1,4-butendiol and decynediol; hydroquinonebishydroxyethylether, bisphenol A esterified by two or four propylene oxide groups; dimethylolpropionic acid.

The polyol component preferably further comprises at least one polyol with a functionality of greater than 2, particularly monomeric aliphatic triols such as glycerol, trimethylolpropane, triols with polyether chains, polycaprolactone triols, with the molecular weight of said triols generally being between 90 and 1000, mixed polyether/polyester polyols with a functionality of greater than 2, for example a functionality of between 2 and 3.

The proportions between the long polyol, the short diol and the polyol with a functionality of greater than 2 can vary as a function of the selection of the other components of the primer.

The isocyanate component comprises at least one isocyanate selected in particular from among the following aliphatic isocyanates: hexamethylenediisocyanate (TMDI), 2,2,4-trimethyl-1,6-hexanediisocyanate (TMDI), bis 4-isocyanatocyclohexylmethane (Hylene W), bis-3-methyl-4-isocyanatocyclohexylmethane, 2,2-bis(4-isocyanatocyclohexyl)propane, 3-isocyanatomethyl-3,5,5-trimethylcyclohexylisocyanate (IPDI), m-xylylenediisocyanate (XDI), m- and p-tetramethylxylylenediisocyanate (m- and p-TMXDI), 1,4-trans-cyclohexane diisocyanate (CHDI), 1,3-(diisocyanatomethyl)cyclohexane (hydrogenated XDI) and isocyanates having a functionality of greater than 2 such as isocyanate biurets or isocyanurates.

In addition to the reactive mixture described above, the primer used within the framework of the invention can contain other components. It can thus contain a catalyst, such as a tin catalyst, for example tin dibutyldilaurate, tributyltin oxide, tin octoate, an organomercuric catalyst, for example mercuric phenyl ester, an amine catalyst, for example diazabicyclo[2.2.2]-octane, 1,8-diazabicyclo-[5.4.0]-1,7-decene.

The primer can also contain a stabilizer such as bis(2,2,6,6,-tetramethyl-4-piperidyl) sebacate, a phenolic antioxidant.

The primer can further contain an organosilane, for example gamma-aminopropyltrimethoxysilane, gamma-aminopropyltriethoxysilane, gamma-glycidoxypropyltrimethoxysilane, gamma-mercaptopropyltrimethoxysilane, etc.

Since the primer is applied in a liquid form, as described below, it is generally necessary to include an organic liquid therein, which is generally a solvent or a diluent for the reactive mixture. For this purpose methylethylketone, tetrahydrofuran or xylol for example can be used.

The primer can be deposited at one time on at least one of the elements; the support or the plastic sheet to be assembled. The primer is applied onto the glazed edge of the support and/or on the corresponding part of the polyurethane layer of the plastic sheet which is required to come into contact with the glazed edge.

The primer can be deposited just before assembly. The deposit can be carried out using for example a pad, a brush, or a scraper or even by close-up pulverization or with a mask. When the primer contains a silane, it can be deposited in one step. In an alternative embodiment, it can be deposited in two steps: a first step preceding assembly by a period of time which can vary from several minutes to several days, followed by a second step just before assembly.

In this alternative embodiment, in the first step the silane is deposited in the form of an aqueous solution of approximately 1% in an alcohol or a mixture of alcohol or even in a mixture of alcohol and water. The alcohol can for example be selected from among ethanol, isopropanol, etc. In the second step the other components of the primer are deposited just before assembly.

The method in accordance with the invention is particularly applicable for the manufacture of a laminated glass comprising a monolithic or laminated glass support and a sheet of plastic comprising a polyurethane layer having its adhesion properties directed on the side of the glass support and a polyurethane layer with surface properties such as resistance to scratching and abrasion, which is autocicatrizing and non-lacerating, on the side directed towards the outside of the glass, and generally towards the passenger compartment. In the framework of the invention, the support of course has a glazed edge on the side covered by the plastic sheet.

In addition to adhesion properties, the polyurethane layer which is contacted with the glass support can have energy-absorbing properties.

Plastic sheets having both a polyurethane layer with adhesion properties and, as necessary, energy-absorbing properties, and a polyurethane layer with surface properties are described, for example, in French patent publication No. 2 398 606 and European patent publication No. 0 133 090.

The polyurethane layer with surface properties can further be formed from a reactive mixture comprising a multifunctional isocyanate component and a multifunctional polyol component, possibly a reaction catalyst and other auxiliary substances. The isocyanate component is selected from among the essentially trifunctional aliphatic polymers formed from monomeric 1,6-hexamethylenediisocyanate, and in particular its biurets or its isocyanurates. This trifunctional aliphyatic polymer should have a radical NCO content of 15 to 25% by weight. The polyol component is selected from among the multifunctional polyesterpolyols having a radical OH content of 3 to 12% by weight.

The glazed edge, onto which the polyurethane layer is adhered in accordance with the invention, is formed in a well-known manner by the deposit of a suitable paste using serigraphy. The treatment in accordance with the invention is therefore carried out on the glazed edge after firing of the glaze. The paste deposited is that conventionally used in the manufacture of glasses with a glazed edge.

Other features of the invention will become apparent in the course of the following description of exemplary embodiments which are given for illustration of the invention and are not intended to be limiting thereof.

The following examples relate to the manufacture of a safety windshield comprising (1) a sheet of glass and (2) a sheet of plastic formed from (2a) a layer of polyurethane with adhesion and energy absorbing properties and (2b) a layer of polyurethane with surface and auto-cicatrizing properties. The sheet of glass is a refired or tempered glass and it is provided with a glazed band obtained by a deposit using serigraphy with a suitable glaze paste.

The glazes used are glazes used for gluing conventional laminated glasses on the bay of bodywork. They are, for example, lead borosilicates on a UV-polymerizable acrylic medium.

The plastic sheet is obtained for example in the following manner:

A homogeneous mixture with the following proportions:

1000 g of a polyether with a molecular weight of approximately 450 obtained by condensation of 1,2-propylene oxide with 2,2-bis(hydroxymethyl)-1-butanol and a content of free hydroxyl radicals of approximately 10.5 to 12%, containing 1% by weight of a stabilizer, 0.05% by weight of a catalyst (dibutyltin dilaurate) and 0.1% by weight of a sheeting agent, 1020 g of a 1,6-hexanediisocyanate biuret with a content of free isocyanate radicals of approximately 23.2%, is poured onto a movable glass support passing in a continuous manner and coated with a separation agent which can, for example be that which is described in French patent publication No. 2 383 000, i.e., an addition product modified with ethylene oxide.

A pouring head such as the one described in French patent publication No. 2 387 170 is used. A uniform layer is formed which, after polymerization under the effect of heat, for example approximately 15 minutes at 120° C., has a thickness of approximately 0.19 mm and autocicatrizing properties.

To manufacture the layer with energy-absorbing properties, the polyol component is first prepared by mixing a polytetramethyleneglycol with a molecular weight of 1000 (for example the product sold under the name Polymeg 1000 by the QUAKER OATS company) with 1,4-butanediol and with polycaprolactonetriol, with the proportions of the three constituents being such that the polytetramethyleneglycol brings the equivalent of 0.35 hydroxyl groups, the 1,4-butanediol brings 0.45 and the polycaprolactonetriol 0.20.

A stabilizer is incorporated into the polyol component at a rate of 0.5% by weight of the total weight of the polyol component and the polyisocyanate component, a sheeting agent at a rate of 0.05% by weight calculated in the same manner and a dibutyltin dilaurate catalyst at a rate of 0.02% by weight calculated in the same manner as above.

The isocyanate component used is 3-isocyanatomethyl-3,5,5-trimethylcyclohexylisocyanate (IPDI) which has urea functions obtained by partial hydrolysis of the IPDI and with a content of NCO groups of approximately 31.5% by weight. The components are used in quantities such that the NCO/OH ratio is 1.

After degassing the components under a vacuum, the mixture brought to approximately 40° C. and poured using a pouring head such as the one described in French patent publication No. 2 347 170, onto the previously formed auto-cicatrizing polyurethane layer. In this manner a layer of approximately 0.53 mm in thickness is formed which is submitted to a polymerization cycle consisting of heating to approximately 120° C. in 25 minutes.

The sheet with two layers is removed from the glass support and can be easily handled, stocked or used just after for the manufacture of laminated glasses in accordance with the invention.

Examples 1 to 6 relate to the manufacture of glasses using a treatment by one of the primers comprising a prepolymer-based reactive mixture with free NCO groups obtained as described below.

SYNTHESIS OF PREPOLYMERS WITH FREE NCO GROUPS

Prepolymer 1

183.75 g (0.35 eq) of 1,4-butanediol polyadipate and 2-methyl-1,4-butanediol with a molecular weight approximately equal to 1000 (for example the product sold under the name T 1136 by the HUELS company), 720 g of methylethylketone as a solvent, 175.95 g (1.15 eq) of 3-isocyanatomethyl-3,5,5-trimethylcyclohexylisocyanate (IPDI) having urea functions and a content of NCO groups of 31.5% by weight were mixed in a reactor.

The mixture was stirred for 10 hours at 80° C. A prepolymer in solution was obtained, with a dry extract of approximately 33%, containing 3.1% by weight of free NCO in relation to the weight of the dry extract. The viscosity of the solution was approximately 10 centipoises.

Prepolymer 2

The following were mixed successively in a reactor:
850 g of methylethylketone as solvent;
183.75 g (0.35 eq) of polyester T 1136;
13.5 g (0.15 eq) of 1,4-butanediol;
175.95 g (1.15 eq) of IPDI containing urea functions.

The mixture was stirred for 24 hours at 50° C. A prepolymer in solution was obtained, with a dry extract of approximately 30%, containing 2.2% by weight of free NCO in relation to the weight of the dry extract. The viscosity of the solution was approximately 10 centipoises.

Prepolymer 3

The following were mixed successively in a reactor:

183.75 g (0.35 eq) of polyester T 1136;
20.25 g (0.45 eq) of 1,4-butanediol;
175.95 g (1.15 eq) of IPDI containing urea functions.

The mixture was stirred for 1 hour at 50° C., then 850 g of methylethylketone were added. The solution obtained was stirred for 22 hours at 50° C. A prepolymer in solution was obtained, with a dry extract of approximately 30%, containing 1.2% by weight of free NCO in relation to the weight of the dry extract. The viscosity of the solution was approximately 10 centipoises.

Prepolymer 4

127 g of methylethylketone;
168 g (0.32 eq) of polyester T 1136;
18.45 g (0.41 eq) of 1,4-butanediol;
175.95 g (1.15 eq) of IPDI containing urea functions.

The mixture was stirred for 20 hours at 50° C., until the theoretical percentage of free NCO functions was obtained. A prepolymer in solution was obtained, with a dry extract of approximately 74%, containing 3.6% by weight of free NCO in relation to the weight of the dry extract. The viscosity of the solution was approximately 1500 centipoises.

Prepolymer 5

The same method and same components were used as for the preparation of prepolymer 3, except that the polyester T 1136 was replaced with 175 g (0.35 eq) of polytetramethyleneglycol with a molecular weight of 1000.

The prepolymers described above can be kept under nitrogen and away from light. They are stable for several weeks.

EXAMPLE 1

Just before use, prepolymer 1 was mixed with 20.25 g (0.45 eq) of a polycaprolactonetriol with a molecular weight of 300, 2.0 g of Tinuvin 765 stabilizer, 0.080 g of DBTL catalyst, 2.0 g of silane, which was gamma-glycidoxypropyltrimethoxysilane.

This mixture was stirred for 5 minutes at room temperature for homogenization. A primer was obtained with an extract of approximately 36% and a viscosity of approximately 10 centipoises.

Using a pad, this primer was applied on the glazed edge of the glass to give a dry deposit thickness of approximately 5 to 15 micrometers. This was allowed to dry for approximately 1 to 2 minutes at room temperature before carrying out the assembly operation using calendering for the sheet of glass with the sheet of plastic obtained as described previously. The assembly was carried out by directing the layer of polyurethane with energy-absorbing properties against the surface of the glass sheet which has the glazed band.

The assembly produced was then subjected to an autoclave cycle for 1 hour under a pressure of approximately 10 bars, at a temperature of 135° C.

To show the improvements provided by the method in accordance with the invention with regard to the peripheral adhesion of the plastic sheet with the glazed band, the immediate gluing at the moment of assembly by calendering can be appreciated and shearing resistance measurements were carried out after the autoclave cycle.

The results are reported in Table 1.

EXAMPLE 2

The method of Example 1 was used, except that a primer was prepared by mixture of the following components:

13.5 g (0.30 eq) of 1,4-butanediol, 20.0 g (0.20 eq) of Tinuvin 765 as a stabilizer, 0.080 g of dibutyltin dilaurate as a catalyst, 2.0 g of silane and 790 g of methylethylketone were added to prepolymer 2, with the silane in this case, as in the other examples, being gamma-glycidoxypropyltrimethoxysilane.

A primer was obtained with a dry extract of approximately 20% and a viscosity of approximately 5 to 10 centipoises.

EXAMPLE 3

The method of Example 1 was used, except that a primer was prepared by mixture of the following components:

20.0 g (0.2 eq) of polycaprolactonetriol, 2.0 g of Tinuvin 765 as a stabilizer, 0.080 g of dibutyltin dilaurate (DBTL) as a catalyst, 2.0 g of silane and 766 g of methylethylketone were added to prepolymer 3.

A primer was obtained with a dry extract of approximately 20% and a viscosity of approximately 5 to 10 centipoises.

EXAMPLE 4

The method of Example 1 was used, except that a primer was prepared by mixture of the following components:

27 g (0.27 eq) of polycaprolactonetriol, 2.0 g of Tinuvin 765 as a stabilizer, 0.080 g of DBTL, 2.0 g of silane and 1891 g of methylethylketone were added to prepolymer 4.

A primer was obtained with a dry extract of approximately 17% and a viscosity of approximately 5 centipoises.

EXAMPLE 5

The method of Example 1 was used, except that a primer was prepared by mixture of the following components:

20.0 g (0.2 eq) of polycaprolactonetriol, 68.25 g (0.35 eq) of hexamethylenediisocyanate biuret, 2.34 g of Tinuvin 765 as a stabilizer, 0.093 g of DBTL, 2.34 g of silane and 1042 g of methylethylketone were added to prepolymer 3.

A primer was obtained with a dry extract of approximately 20% and a viscosity of approximately 5 centipoises.

EXAMPLE 6

The method of Example 1 was used, except that a primer was prepared by mixture of the following components:

20.0 g (0.2 eq) of polycaprolactonetriol, 2.0 g of Tinuvin 765 as a stabilizer, 0.080 g of DBTL as a catalyst, 2.0 g of silane and 780 g of methylethylketone were added to prepolymer 5.

A primer was obtained with a dry extract of approximately 20% and a viscosity of approximately 5 to 10 centipoises.

Examples 7 to 9 relate to the manufacture of glasses using a treatment with the primers containing a reactive mixture formed by a polyol component and an isocyanate component.

EXAMPLE 7

The following were mixed just before use:

175 g (0.35 eq) of polytetramethyleneglycol with a molecular weight of approximately equal to 1000 (for example the product sold under the name Polymeg 1000 by the QUAKER OATS Company), 20.25 g (0.45 eq) of 1,4-butanediol, 20 g (0.20 eq) of polycaprolactonetriol with a molecular weight of 300, 439 g of methylethylketone, 2 g of Tinuvin 765, 0.08 g of DBTL, 2 g of silane, and 165 g (1.10 eq) of IPDI with urea functions.

The mixture was stirred for 2 minutes at room temperature. The primer obtained had a dry extract of 46%. The viscosity was 4 centipoises.

Using a pad the primer was applied on the glazed edge of the glass sheet to obtain a thickness of dry deposit of between 5 and 15 micrometers.

After drying for 10 minutes in a drying stove at 50° C., the laminated glass was then manufactured as described in Example 1.

EXAMPLE 8

The method of Example 7 was used, but the following were mixed just before use:

183.75 g (0.35 eq) of polyester T 1136, 20.25 g (0.45 eq) of 1,4-butanediol, 20.0 g (0.20 eq) of polycaprolactonetriol with a molecular weight of 300, 439 g of methylethylketone, 2 g of Tinuvin 765, 0.08 g of DBTL, 2 g of silane, and 165 g (1.10 eq) of IPDI with urea functions.

The primer obtained had a dry extract of approximately 47%. The viscosity was 5 centipoises.

EXAMPLE 9

The method of Example 7 was used, but the following were mixed just before use:

219 g (0.35 eq) of polycaprolactonediol with a molecular weight of approximately 1000, 20.25 g (0.45 eq) of 1,4-butanediol, 20.0 g (0.20 eq) of polycaprolactonetriol with a molecular weight of 300, 856 g of methylethylketone, 2 g of Tinuvin 765, 0.08 g of DBTL, 2 g of silane, and 1.65 g (1.10 eq) of IPDI with urea functions.

The primer obtained had a dry extract of approximately 50%. The viscosity was 6 centipoises.

Example 10 relates to the manufacture of a glass using a treatment with a primer comprising a reactive mixture containing a prepolymer with OH ends.

EXAMPLE 10

A prepolymer was first manufactured in the following manner:

107.10 g (0.70 eq) of IPDI containing urea functions, together with 1.85 g of Tinuvin 765, 0.07 g of DBTL, 0.74 g of silane, in this case gamma-glycidoxypropyltrimethoxysilane, were added under stirring to a mixture of 172.55 g (0.35 eq) of Polymeg 1000, 24,75 g (0.55 eq) of 1,4-butanediol and 21.3 g (0.10 eq) of Desmophen 1140. The mixture was left to react under stirring for 2 hours at room temperature.

The prepolymer obtained had a dry extract of 50% and a viscosity of 100 centipoises.

It can be kept under nitrogen atmosphere away from light. 45.9 g (0.30 eq) of IPDI containing urea functions and a content of NCO groups of 31.5% by weight were added to the preceding solution, in order to obtain the primer. This was carried out just before its application to the glazed edge.

The glazed edge of the glass was treated as in the preceding examples.

EXAMPLE 11

This example relates to the manufacture of a glass using a treatment with a primer comprising a reactive mixture containing a thermoplastic polyurethane and at least one isocyanate with a functionality of greater than 2.

The glass manufactured in this case is a glass formed from a laminated support, composed of two sheets of glass and an interposed sheet of polyvinylbutyral, and from a sheet of plastic with a thermoplastic polyurethane layer which has adhesion properties and a heat-hardenable polyurethane layer which has autocicatrizing and antilacerating properties as described, for example, in French patent publication No. 2 398 606. The glass sheet receiving the thermoplastic polyurethane layer is provided with a glazed edge.

In order to form the primer, 7.5 g of a thermoplastic polyurethane, which is the reaction product of bis-4-isocyanatocyclohexylmethane (Hylene W) and an adipic acid, hexanediol and neopentylglycol polyester, 60.0 g of tetrahydrofuran, 15.0 g of methylethylketone, 15.0 g of xylol and 0.1 g of gamma-glycidoxypropyltrimethoxysilane were mixed. After homogenization, this mixture was able to be stored.

Just before the application of the primer to the glazed edge of the glass, 7.5 g of a hexamethylenediisocyanate biuret was added to the preceding mixture.

The primer was then applied with a pad to the glazed edge of the glass support of the glass.

The glass was then assembled as in the preceding examples.

COMPARATIVE EXAMPLES

EXAMPLE 12

A glass was manufactured as in the preceding examples, but without treating the glazed edge with a primer.

EXAMPLE 13

A glass was manufactured as in Example 1, but replacing the primer in accordance with the invention by a solution of approximately 1% by weight of gamma-glycidoxypropyltrimethoxysilane in methylethylketone.

EXAMPLE 14

A glass was manufactured as in Example 1, but replacing the primer in accordance with the invention by a solution of a silane sold under the name Y 4310 by Union Carbide in methylethylketone.

To show the good adhesion properties obtained by the method in accordance with the invention, 10×10 cm samples of glass manufactured in accordance with the preceding examples were subjected to shearing tests.

A metal section of 125×25 mm, previously treated with a metal primer, was glued onto these test pieces with a mastic gluing cord, to obtain a gluing joint with a rectangular crosssection of 12.5×2 mm. The gluing surface is therefore 125×25 mm. The gluing mastic is a polyurethane used for gluing windshields to the bay in the body. Such a mastic is sold under the name Betaseal by the Gurit Essex company.

The tests were carried out after at least 168 hours of hardening for the gluing, at room temperature.

The test pieces were placed under shearing traction in accordance with two parallel planes in a dynamometer recorder at a speed of 10 mm/mn. The force necessary for the rupture of the gluing was recorded. This force was divided by the gluing surface to obtain the breakage resistance in MPa.

These shearing measurements were carried out:

(a) in "the new state" on test pieces left for at least 168 hours at room temperature.

(b) on test pieces which had undergone a damp cataplasm cycle. For this purpose the glue joint was surrounded by dampened pieces of absorbent cotton and the test piece was placed into a sealed polyethylene bag. It was left for 7 days in a drying oven at 70° C., then for 2 hours at −20° C. and the test pieces were removed from the bag. After having removed the cotton pieces and left to rest for 2 hours at room temperature, the measurement was carried out. The results are given in Table 1.

The column entitled immediate adhesion contains the following notations:

(++) and (+) when the immediate adhesion was very good and good, respectively, that is, when there was no peripheral detaching during and after the calendering operation;

(−) when peripheral detaching was observed during calendering or before the autoclave cycle.

TABLE 1

| Examples | Immediate Adhesion | Resistance to shearing at the start | Resistance to shearing after cataplasm |
|---|---|---|---|
| 1 | (++) | 5.8 | 1.5–2.5 |
| 2 | (++) | 5.0 | 2.4–3.1 |
| 3 | (++) | 5.0 | 2.3–2.5 |
| 4 | (++) | 5.3 | 1.5–4.6 |
| 5 | (++) | 5.0 | 2.3–3.5 |
| 6 | (++) | 4.5 | 2.1–2.3 |
| 7 | (+) | 4.5 | 1.1–1.9 |
| 8 | (+) | 5.0 | 2.0–3.5 |
| 9 | (+) | 5.1 | 1.4–2.3 |
| 10 | (++) | 6.0 | 0.6–1.6 |
| 11 | (++) | 5.0 | 0.8–1.6 |
| 12 | (−) | 5.0 | 0.7–1.6 |
| 13 | (−) | 5.0 | 0.7–1.6 |
| 14 | (−) | 5.0 | 0.9–1.2 |

Table 1 shows the good immediate adhesion obtained during calendering and provided by the primers in accordance with the invention (Examples 1 to 11). This immediate adhesion was insufficient with glasses outside the present invention as evidenced by the fact that detaching in the other cases is observed (Examples 12 to 14).

Resistance to shearing maintains a high value when the glazed edge has been treated with a primer in accordance with the invention, even after conditioning in a damp atmosphere.

When no primer is used in accordance with Example 12, or when only silanes are used in accordance with Examples 13 and 14, the resistance to shearing after a damp cataplasm has values which are too low to enable gluing of the glass to the bay of the body by gluing of the glue joint onto the plastic sheet.

The primers used in Examples 10 and 11 facilitate the assembly of the plastic sheet and the support. Nevertheless, the values obtained for resistance to shearing after cataplasm do not enable gluing of the glass to the bay of the body by gluing of the glue joint onto the plastic coating sheet.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for the manufacture of a laminated glass assembly comprising (1) a monolithic glass or a laminated glass or a plastic support having a glazed edge on one of its surfaces, and (2) a sheet of plastic comprising at least one layer of polyurethane disposed thereon, said layer of polyurethane being in contact with the said surface having the glazed edge, said method comprising:

treating at least one surface of the said glazed edge with the polyurethane layer with a primer before assembly of the support with the said sheet of plastic and on an area corresponding essentially to the said glazed edge, said primer comprising a reactive mixture having free NCO groups and free OH groups, wherein the said free NCO groups are capable of reacting with the glazed support and with the said sheet of plastic and of forming cross-linking bonds with the other components of the primer during heat cycle of the subsequent assembly, and wherein said reactive mixture is prepared with a ratio of free NCO groups to free OH groups of at least 1.10 to 1.0;

assembling the said sheet of plastic with the said support to obtain a laminate glass assembly; and subjecting the glass assembly to a heat cycle causing the reaction of the said primer and a definitive adhesion on the periphery of the said laminated glass.

2. The method of claim 1, comprising using as the said reactive mixture a mixture comprising a polyol component and an isocyanate component, with at least one of the two components providing cross-linking bonds.

3. The method of claim 2, wherein at least one of the two components has a functionality of greater than 2.

4. The method of claim 1, wherein the reactive mixture comprises a urethane prepolymer with free NCO groups and at least one polyol with a functionality of greater than 2.

5. The method of claim 4, wherein the reactive mixture further comprises at least one short diol.

6. The method of claim 4, wherein the reactive mixture further comprises at least one isocyanate with a functionality of greater than 2.

7. The method of claim 1, wherein the reactive mixture comprises a polymer with free OH groups and at least one isocyanate with a functionality at least equal to 2.

8. The method of claim 7, wherein the reactive mixture comprises at least one isocyanate with a functionality of greater than 2.

9. The method of claim 7, wherein the isocyanate component is in excess in relation to the free OH of the reactive mixture.

10. The method of claim 1, wherein the reactive mixture comprises a polyurethane and at least one isocyanate with a functionality of greater than 2.

11. The method of claim 1, wherein the primer further contains a catalyst.

12. The method of claim 1, wherein the primer further contains a stabilizer.

13. The method of claim 1, wherein the primer further contains a silane.

14. The method of claim 1, wherein the primer is a solution having a dry extract of between 10 and 70% by weight.

15. The method of claim 1, wherein the primer is prepared just before its application on the glazed edge.

16. The method of claim 1, wherein the reactive mixture comprises the same components or equivalent components to those in the composition of the polyurethane layer intended to be glued to the support.

17. The method of claim 1, wherein the surface of the support having the glazed edge is a sheet of glass.

18. The method of claim 1, wherein the heat cycle consists of bring the glass to approximately 130° C. for approximately 1 hour.

19. The method of claim 1, wherein the plastic sheet is assembled with the support using a calendering operation.

20. A laminated glass assembly comprising (1) a monolithic glass or a laminated glass or a plastic support having a glazed edge on one of its surfaces, and (2) a sheet of plastic comprising at least one layer of polyurethane disposed thereon, said layer of polyurethane being in contact with the said surface having the glazed edge, said laminated glass assembly being prepared by treating at least one surface of the said glazed edge with the polyurethane layer with a primer before assembly of the support with the said sheet of plastic and on an area corresponding essentially to the said glazed edge, said primer comprising a reactive mixture having free NCO groups and free OH groups, wherein the said free NCO groups are capable of reacting with the glazed support and with the said sheet of plastic and of forming cross-linking bonds with the other components of the primer during heat cycle of the subsequent assembly, and wherein said reactive mixture is prepared with a ratio of free NCO groups to free OH groups of at least 1.10 to 1.0;

assembling the glass assembly to a heat cycle causing the reaction of the said primer and a definitive adhesion on the periphery of the said laminated glass.

21. The laminated glass assembly of claim 20, said laminated glass assembly being prepared by using as the said reactive mixture a mixture comprising a polyol component and an isocyanate component, with at least one of the two components providing cross-linking bonds.

22. The laminated glass assembly of claim 21, said laminated glass assembly being prepared by using a process in which at least one of the two components has a functionality of greater than 2.

23. The laminated glass assembly of claim 20, said laminated glass assembly being prepared by using a process in which the reactive mixture comprises a urethane prepolymer with free NCO groups and at least one polyol with a functionality of greaer than 2.

* * * * *